United States Patent
Austel et al.

(10) Patent No.: US 9,712,607 B2
(45) Date of Patent: *Jul. 18, 2017

(54) RELEASE AND MANAGEMENT OF COMPOSITE APPLICATIONS ON PAAS

(71) Applicant: International Business Machines Corporation, Armonk, NY (US)

(72) Inventors: Paula K. Austel, Cortlandt Manor, NY (US); Han Chen, White Plains, NY (US); Thomas A. Mikalsen, Cold Spring, NY (US); Isabelle M. Rouvellou, New York, NY (US); Upendra Sharma, Elmsford, NY (US); Ignacio Silva-Lepe, Putnam Valley, NY (US); Revathi Subramanian, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 93 days.

This patent is subject to a terminal disclaimer.

(21) Appl. No.: 14/748,760

(22) Filed: Jun. 24, 2015

(65) Prior Publication Data

US 2016/0321051 A1    Nov. 3, 2016

Related U.S. Application Data

(63) Continuation of application No. 14/699,418, filed on Apr. 29, 2015.

(51) Int. Cl.
*G06F 9/50* (2006.01)
*H04L 29/08* (2006.01)
(Continued)

(52) U.S. Cl.
CPC ............... *H04L 67/10* (2013.01); *G06F 8/60* (2013.01); *G06F 8/76* (2013.01); *G06F 9/5055* (2013.01);
(Continued)

(58) Field of Classification Search
CPC .. G06F 11/3604; G06F 17/30371; G06F 8/51; G06F 8/61; G06F 9/5055;
(Continued)

(56) References Cited

U.S. PATENT DOCUMENTS 8,332,459 B2   12/2012   Blum et al.
8,806,185 B2    8/2014   Buehler et al.
(Continued)

OTHER PUBLICATIONS

D'Andria, F. et al., "Cloud4SOA: Multi-Cloud Application Management Across PaaS Offerings" 2012 IEEE 14th International Symposium on Symbolic and Numeric Algorithms for Scientific Computing (IEEE: SYNASC) (Sep. 26-29, 2012) pp. 407-414.

(Continued)

*Primary Examiner* — Le H Luu
(74) *Attorney, Agent, or Firm* — Scully, Scott, Murphy & Presser, P.C.; Louis J. Percello, Esq.

(57) ABSTRACT

A solution descriptor comprises a set of component workload units, a workload unit describing a deployable application component with application binary, configuration parameters and dependency declarations. An environment descriptor specifies a set of target platforms and plugins in an execution environment. A deployer interprets the solution descriptor and the environment descriptor, and generates a list of tuples comprising compatible workload-plugin-platform combinations. The deployer determines an execution order for the list of tuples, and invokes the plugins in the list of tuples in the execution order, wherein each of the plugins executes a corresponding compatible workload on a corresponding compatible target platform specified in the list of tuples.

7 Claims, 8 Drawing Sheets

(51) Int. Cl.
*G06F 9/445* (2006.01)
*G06F 9/44* (2006.01)

(52) U.S. Cl.
CPC .......... *H04L 67/025* (2013.01); *H04L 67/327* (2013.01); *H04L 67/34* (2013.01)

(58) Field of Classification Search
CPC .......... G06F 8/76; G06F 8/60; G06Q 10/107; G06Q 10/10; H04L 41/084; H04L 67/10; H04L 67/025; H04L 67/34; H04L 67/327
See application file for complete search history.

(56) References Cited

U.S. PATENT DOCUMENTS

| | | |
|---|---|---|
| 8,839,198 B2 | 9/2014 | Claussen et al. |
| 8,904,368 B2 | 12/2014 | Haenel et al. |
| 2004/0139157 A1* | 7/2004 | Neely, III ............... G06Q 10/10 709/205 |
| 2005/0050525 A1* | 3/2005 | Chittar ...................... G06F 8/51 717/136 |
| 2005/0081192 A1* | 4/2005 | DeLine ............... G06F 11/3604 717/126 |
| 2006/0230314 A1* | 10/2006 | Sanjar ...................... G06F 8/61 714/26 |
| 2007/0073851 A1* | 3/2007 | Baikov ................. H04L 41/084 709/220 |
| 2012/0089726 A1* | 4/2012 | Doddavula ............. H04L 67/34 709/224 |
| 2012/0159425 A1 | 6/2012 | Shukla et al. |
| 2012/0216180 A1 | 8/2012 | Fischer et al. |
| 2012/0239825 A1 | 9/2012 | Xia et al. |
| 2012/0324069 A1 | 12/2012 | Nori et al. |
| 2013/0191726 A1 | 7/2013 | Park et al. |
| 2013/0339313 A1* | 12/2013 | Blaine ............... G06F 17/30371 707/691 |
| 2013/0346943 A1 | 12/2013 | Bharatia |
| 2014/0089420 A1* | 3/2014 | Morris ................. G06Q 10/107 709/206 |
| 2014/0123106 A1 | 5/2014 | Mallick et al. |
| 2014/0136711 A1 | 5/2014 | Benari et al. |
| 2016/0147522 A1* | 5/2016 | Dimitrakos ............... G06F 8/61 717/174 |

OTHER PUBLICATIONS

IP.COM et al.; "Systems and Methods for Multiple Platforms Management on a PaaS Platform" IPCOM000238691D, (Sep. 12, 2014) pp. 1-9.

Paraiso, F. et al., "A Federated Multi-Cloud PaaS Infrastructure" 2012 IEEE 5th International Conference on Cloud Computing (IEEE: CLOUD) (Jun. 24-29, 2012) pp. 392-399.

Fazio, M. et al., "The Need of a Hybrid Storage Approach for IoT in PaaS Cloud Federation" 2014 28th IEEE International Conference on Advanced Information Networking and Applications Workshops (IEEE: WAINA) (May 13-16, 2014) pp. 779-784.

List of IBM Patents or Patent Applications Treated as Related, dated Jun. 24, 2015, 2 pages.

Office Action dated Nov. 28, 2016 received in parent U.S. Appl. No. 14/699,418, 10 pages.

* cited by examiner

Solution Descriptor
---
name: SimpleSampleSolution releases:
- name: simple-rel
  version: latest apps:
- name: FrontEnd
  release: simple-rel
  app_package: front_end
  command: python front_end.py
  buildpack: https://github.com/ibmjstart/heroku-buildpack-python-05June2013.git
  instances: 2
  memory: 512
  urls: [sf-simple-sample.ng.bluemix.net]
  services: [queue]
  environment:
    backEndURL: *http://sf-backend-sample.ng.bluemix.net*

-name: BackEnd
 release: simple-rel
 app package: back_end
 app_back_end
 command: python back_end.py
 buildpack: https://github.com/ibmjstart/heroku-buildpack-python-05June2013.git
 instances: 1

FIG. 4B

RELEASE AND MANAGEMENT OF COMPOSITE APPLICATIONS ON PAAS

FIELD

The present application relates generally to computers and computer applications, and more particularly to composite application deployment and management on computer systems.

BACKGROUND

Solutions often include multiple application components and services bound together. In a cloud based system that provides platforms as a service, e.g., PaaS, applications are deployed in a star topology, for example, apps bind to different services by star topology. For applications that are not structured into a star topology model, it is difficult to deploy those applications and bind them together. For instance, there is no common way to deploy, monitor, and manage solutions on such platforms.

BRIEF SUMMARY

A method and system of specifying, deploying and managing composite applications may be provided. The method, in one aspect, may comprise receiving a solution descriptor comprising a set of component workload units, a component workload unit describing a deployable application component with application binary, configuration parameters and dependency declarations. The method may also comprise receiving an environment descriptor specifying a set of target platforms and plugins available in an execution environment. The method may further comprise generating, based on the solution descriptor and the environment descriptor, a list of tuples comprising compatible workload-plugin-platform combinations. The method may also comprise determining an execution order for the list of tuples. The method may also comprise invoking the plugins in the list of tuples in the execution order, each of the plugins executing a corresponding compatible component workload unit on a corresponding compatible target platform specified in the list of tuples, wherein the set of component workload units comprises an instance of a component application type in a set of component application types, and the set of component application types is extensible.

A system for the description, deployment and management of composite applications, in one aspect, may comprise a processor and a memory device coupled to the processor. A solution descriptor, stored on the memory device, may comprise a set of component workload units, a component workload unit describing a deployable application component with application binary, configuration parameters and dependency declarations. An environment descriptor, stored on the memory device, may specify a set of target platforms and plugins in an execution environment. A deployer may run on the processor, and may be operable to generate, based on the solution descriptor and the environment descriptor, a list of tuples comprising compatible workload-plugin-platform combinations. The deployer may be further operable to determine an execution order for the list of tuples. The deployer may be further operable to invoke the plugins in the list of tuples in the execution order. Each of the plugins may execute a corresponding compatible component workload unit on a corresponding compatible target platform specified in the list of tuples, wherein the set of component workload units comprises an instance of a component application type in a set of component application types, and the set of component application types is extensible.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 4B shows an example of a solution descriptor in one embodiment of the present disclosure.

DETAILED DESCRIPTION

Figure 1:
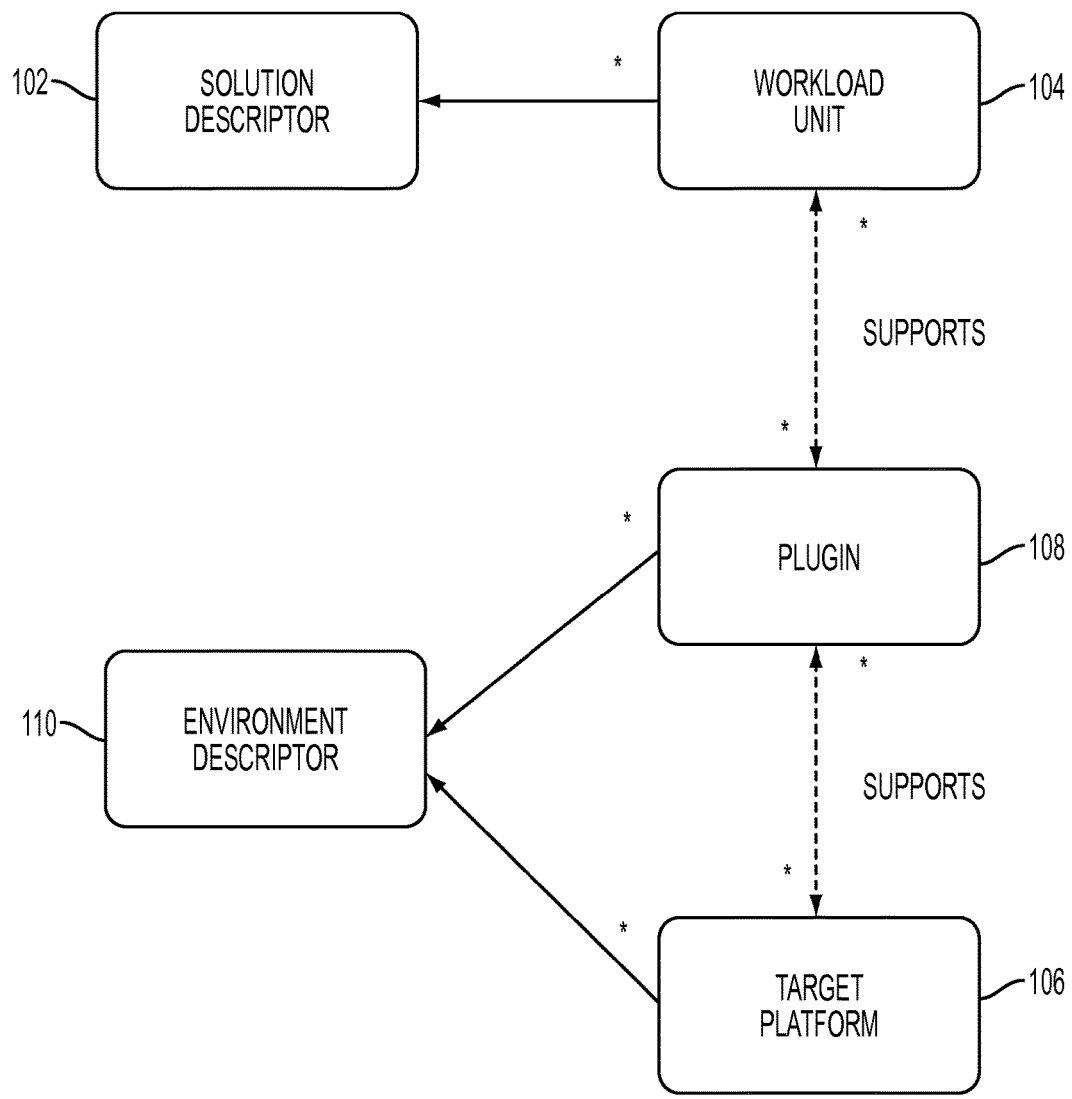
FIG. 1 is a diagram showing components of the present disclosure in one embodiment.

Solution may include two or more application components, for example, a web application components and a resource pool component. A solution developer may leverage cloud shared database (DB) and Queue services. In this context, the developer may desire to leverage an existing platform, e.g., the existing Platform as a Service (PaaS), but may want to have visibility at the level of solutions instead of individual applications. A method, system and techniques may be provided that express the complete solution(s) as a composition of various application components and services. For example, the method, system and techniques may provide for deploying and managing the system in a manner which is consistent with the way the applications are deployed and managed.

Briefly, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include several characteristics, service models, and deployment models. An example of a service model includes Platform as a Service (PaaS). In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

The methodologies described herein may apply to multi-cloud federated PaaS hybrid composition and Hybrid PaaS Manifest-based deployment for composite applications on PaaS. However, it is understood in advance that although this disclosure includes a description on cloud computing, implementation of the teachings recited herein are not limited to a cloud computing environment. Rather, embodiments of the present invention are capable of being implemented in conjunction with any other type of computing environment now known or later developed.

For deploying an application/solution which does not naturally fit the PaaS's deployment model or the like, the system, method and techniques of the present disclosure may extend all the PaaS facilities, such as scaling, load-balancing, and backup-recovery to the solution or composite application. In this way, users can deploy larger variety of applications on PaaS with ease. Users can also obtain all the PaaS features on their composite-application/solution.

A method, system and techniques may be provided that allows for description, deployment and management of solutions or composite applications, for example, on Platform as a Service (PaaS) platforms or the like, referred to herein as a platform. The method, system and technique may create a solution-maestro or a master solution, which manages all the individual application components together on a platform such as PaaS and offers the developer an experience of deploying and managing a similar to that of deploying and managing an application on PaaS.

In one aspect, an intuitive declarative composition language to compose solutions may be provided. The method, system and techniques in one aspect may extend the core services offered by the PaaS platform to solutions as well, for instance, replication, simple health, monitoring, routing/load-balancing, PaaS business support system (BSS). In one aspect, the method, system and techniques of the present disclosure may allow for sharing solution sub-components (e.g., applications or services on PaaS) across solutions. The solution command line bootstraps may be provided by pushing a solution-maestro onto the PaaS.

Services can be bound to applications. Their information (service-end-point and access privileges) is relayed to bound applications. Note that it is usually the case that services do not know about applications. Application and services are bound in a star topology. It is not obvious how to bind different applications and view them as a single application.

An application composition language may be created and provided. In one embodiment, this languages is the solution descriptor language, e.g., which may be written in Yet Another Multicolumn Layout (YAML), which is a language that describes data. An example of a solution descriptor is given in FIG. 4B. A special application, referred to as solution-maestro, may be deployed along with each composite application. A new command line tool may be provided to interface PaaS and solution-maestro to provide a seamless experience to a developer.

In one aspect, the special application referred to as solution maestro in the present disclosure acts a single point of contact for performing various PaaS or like operations on whole of the solution or composite application. In one embodiment, solution maestro may be provided for each application. Each solution maestro has a unique Globally Unique Identifier (GUID) and is made easy to discover amongst various applications. Discovery of solution maestro may be implemented as a Representational State Transfer (REST) Application Programming Interface (API) call in one embodiment. Solution maestro may be deployed on PaaS, and may perform following tasks, one or more of which may be exposed via REST API: List solution and its components; Change component deployment scale and size; Manage various services and their bindings to different components; Report health of solution as a whole and also of individual components; Offer a secure message-board service to all application components for exchanging information; Start/Stop/Restart whole of the application; Obtain declarative textual description of the whole of the solution deployment. In one embodiment, solution maestro is an executable, which is driven by the solution descriptor.

FIG. 1 is a diagram showing components of the present disclosure in one embodiment. A (composite) solution descriptor 102 comprises of a list of component workload units 104. Each workload unit 104 describes a deployable application component with the necessary application binary, configuration parameters, dependency declarations. A workload unit 104 may contain other information. In one embodiment, specifically, each workload unit contains a workload type declaration, for example, web-app, container, map-reduce. In one embodiment, the overall solution descriptor may contain a flat list of component workload units with the workload type embedded in each unit declaration. In another embodiment, workload units of the same type may be grouped together under a common workload type section heading within the overall solution descriptor 102.

At runtime, a workload unit requires a target platform 106 so that its application binary can be deployed (pushed) to. The target platform 106 runs on one or more hardware processors, which for example, are coupled to memory and/or storage devices and may include other hardware peripheral devices. In one embodiment, the solution deployer uses a plugin-based architecture for extensibility. In one embodiment, the solution deployer is a deployment-time portion or aspect of the solution maestro. The solution deployer may run in the same hardware as the target platform, or in different hardware in which the target platform is run.

A plugin 108 interprets sections of the solution descriptor 102 that it understands and deploys the corresponding application binaries to the appropriate target platforms 106. A plugin 108 may be a computer executable that executes or runs on a hardware processor. In one embodiment, plugins are usually not part of the solution, but rather belong to the execution environment. In one embodiment, a plugin 108 is provided by and associated with a particular target platform 106. In one embodiment, a plugin 108 may be able to interpret more than one types of workloads and is able to deploy workloads to more than one target platforms (e.g., 106 and another not shown), for example, a plugin for performing tests locally. In one embodiment of a production environment, highly specialized and optimized plugins may only support one particular workload type and can only deploy to a particular target platform.

A solution execution environment includes a number of target platforms, for example, IBM Bluemix Application runtime (a Platform-as-a-Service for web apps), IBM Bluemix Container service, and IBM Cloud Analytics Application Service for BigInsights (a Hadoop-as-a-Service), from International Business Machines Corporation, Armonk, N.Y., and a number of plugins.

An environment descriptor 110 is a document that describes this collection of target platforms and plugins. When deploying a composite solution, the environment descriptor 110 is given as an additional parameter to the deployer. In one embodiment, the environment descriptor 110 may be provided as a configuration file. In another embodiment, it may be retrieved as a document (e.g., JavaScript Object Notation (JSON) document) from a Uniform Resource Locator (URL) which is given to the deployer.

A workload unit 104 may be an executable object operable to run on a target platform 106, which may comprise a software and hardware such as hardware processor and memory, and other components for running computer executables. A workload unit 104 may be an instance of a component application type.

Figure 2:
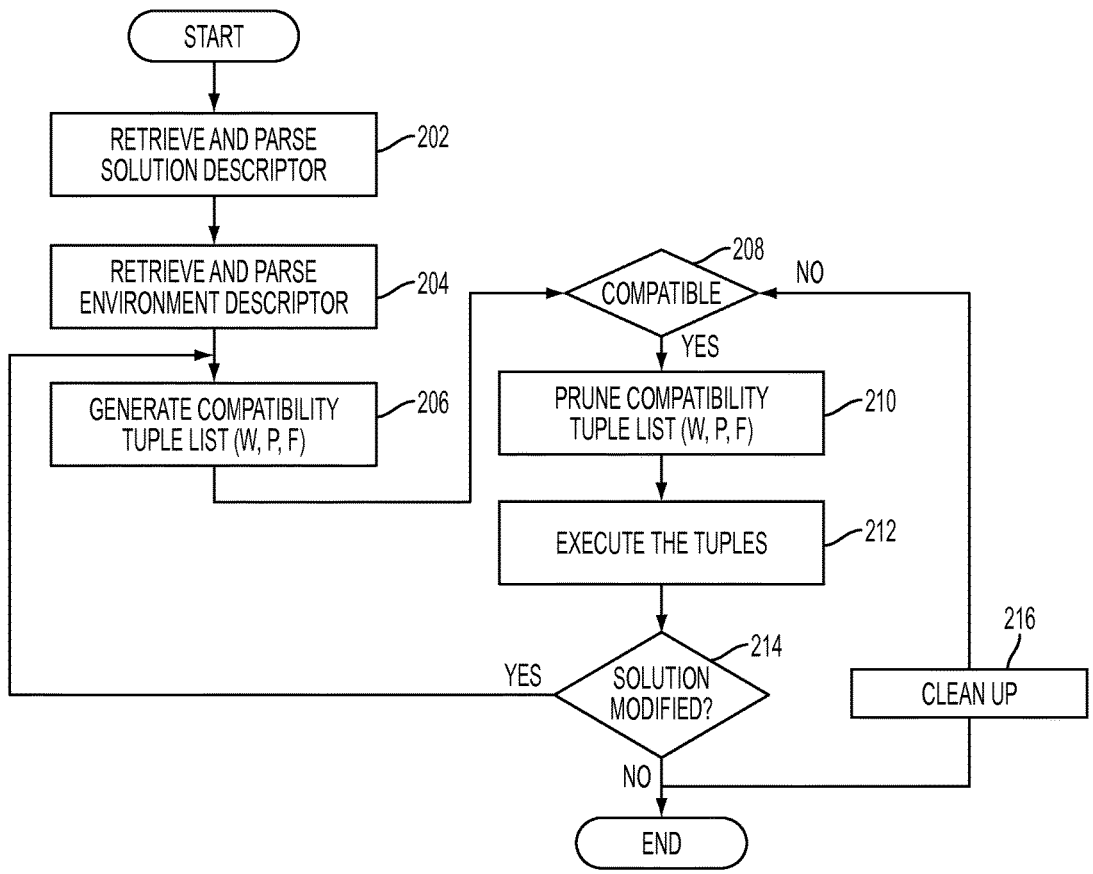
FIG. 2 is a flow diagram illustrating a method of the present disclosure in one embodiment.

FIG. 2 is a flow diagram illustrating a method of the present disclosure in one embodiment. At 202, solution descriptor is retrieved and parsed. At 204, environment descriptor is retrieved and parsed. For instance, when the deployer receives the solution descriptor (e.g., FIG. 1 at 102) and environment descriptor (e.g., FIG. 1 at 110), it parses both documents and creates in-memory objects that represent them. In one embodiment, subsequent operations are performed on these in-memory objects. The deployer architecture allows plugins (e.g., FIG. 1 at 108) to dynamically modify the in-memory solution descriptor object. There may be two main purposes. First, plugins can define dynamic properties (variables), associate them with a workload unit object, and query the values of these dynamic properties. This mechanism enables the plugins to pass information among themselves. This ultimately enables a solution developer to express dependency between workload units by referencing dynamic properties of a dependent workload unit in environment variables of a depending workload unit's own specification. Second, a plugin can dynamically generate new workload units that are needed to carry out the overall deployment of the solution. For example, to consume certain platform services in the micro-service architecture, a web-app plugin may install docker container based "sidecar" components dynamically.

When the deployer receives the initial solution descriptor or whenever any plugin inserts dynamic workload units to the in-memory solution descriptor object, the deployer invokes the following logical steps. We remark that in a particular embodiment of the disclosed method, optimizations may be applied to these steps and they do not change the essence of the method.

At 206, compatibility tuple list (W, P, F) is generated. For example, based on the information parsed from the solution descriptor and the environment descriptor, the deployer iterates through the workload units and generates a list of tuples in the form of (workload, plugin, platform), where plugin is from the available plugins of the environment and platform is one of the target platforms and the plugin can deploy the workload to the platform. Put in another way, this is a list of all compatible workload-plugin-platform combinations. There are different ways to generate this compatibility tuple list. In one embodiment, the deployer may instantiate all plugins available in the environment, and for each combination of workload unit and target platform, interrogate the plugin to determine whether the combination is supported or not by the plugin. In another embodiment, the plugins may declare their supported workload-platform combination in the form of schema. The schema may then be stored as meta data in the plugin registry of the environment. To determine compatibility, the deployer validates the workload declaration against the plugin schema. And this may be facilitated by advanced features of databases.

With this list of compatibility tuples, the deployer validates that solution and environment are compatible. Thus, at 208, it is determined whether the solution (component application) and environment are compatible. The solution and environment are compatible if and only if for each workload unit W in the solution, there exists a tuple (W, P, F) in the list. If the solution and environment are not compatible, the deployer aborts the deployment and cleans up at 216.

At 210, the compatibility tuple list may be pruned. For example, for any given workload unit W, there may exist multiple tuples (W, P_i, F_j). A resolution is made to determine a unique tuple (W, P, F). This may be accomplished through weighting the plugins and/or the target platforms, sorting the tuples according to a combination of the weights and picking the tuple with the highest weight. Additionally, the solution descriptor may allow the developer to specify the preferred plugin and/or platform by their identifiers (IDs) and/or names. If the preferred combination is found in the compatible tuple list, it may be preferentially selected.

Once a unique plugin-platform combination has been determined for each and every workload unit in the solution descriptor, the deployer goes into the dependency resolution phase to determine the execution order of these tuples. Dependency between workload units is created when one unit requires deployment-time dynamic properties from another. For example, the front end web application is configured with the Internet Protocol (IP) address and port number of the database container instance. In one embodiment, this is done by specifying an environment variable in one workload unit (e.g., the front end web app) that references dynamic properties in another workload unit (e.g., the IP and port number of the database docker instance).

There are different ways to resolve the dependency and execute the tuples in correct order. In one embodiment, the deployer may define several execution phases that all plugins conform to. For example, an init phase for initializing the plugins, a deploy phase to deploy the workload binaries (but not starting them) and retrieve the dynamic deployment properties (e.g., IP address, port number, password) and updating the in-memory solution descriptor object, a configure phase for obtaining dynamic properties from dependent workload units and configuring the depending workload units, and finally a start phase for actually starting the workload units. In this phased order, the deployer then invokes the corresponding execution handler of each plugin. In one embodiment, plugins are allowed to create dynamic workload units. Whenever new workload units are created, the overall deployment process is iterated again. In one aspect, this embodiment employs a rigid plugin structure.

In another embodiment, the deployer may determine the execution order more dynamically. In this embodiment, the plugins do not have to implement explicit phases. For each tuple instance (W, P, F), the deployer starts an instance of P, and the execution may be serialized or concurrent. If a serial execution model is used, a plugin yields when its required dynamic properties from another workload unit are not available in the solution object yet. The deployer then context-switches to another tuple for execution. If a concurrent execution model is used, a plugin blocks on a dynamic property for its value to become available, and notifies all blocked plugins when it updates a dynamic property. As long as all plugins adopt the basic safeguard that it always publishes the current workload unit's dynamic deployment properties before it retrieves dependent workload units' properties, deadlocks will not happen. As in the previous embodiment, because plugins are allowed to create dynamic workload units, whenever new workload units are created, the overall deployment process is iterated again.

Thus, at 212, the tuples may be executed as described above. At 214, is the solution is modified, for example, new workload units are created, the logic returns to 206 and iterates the process.

Figure 3:
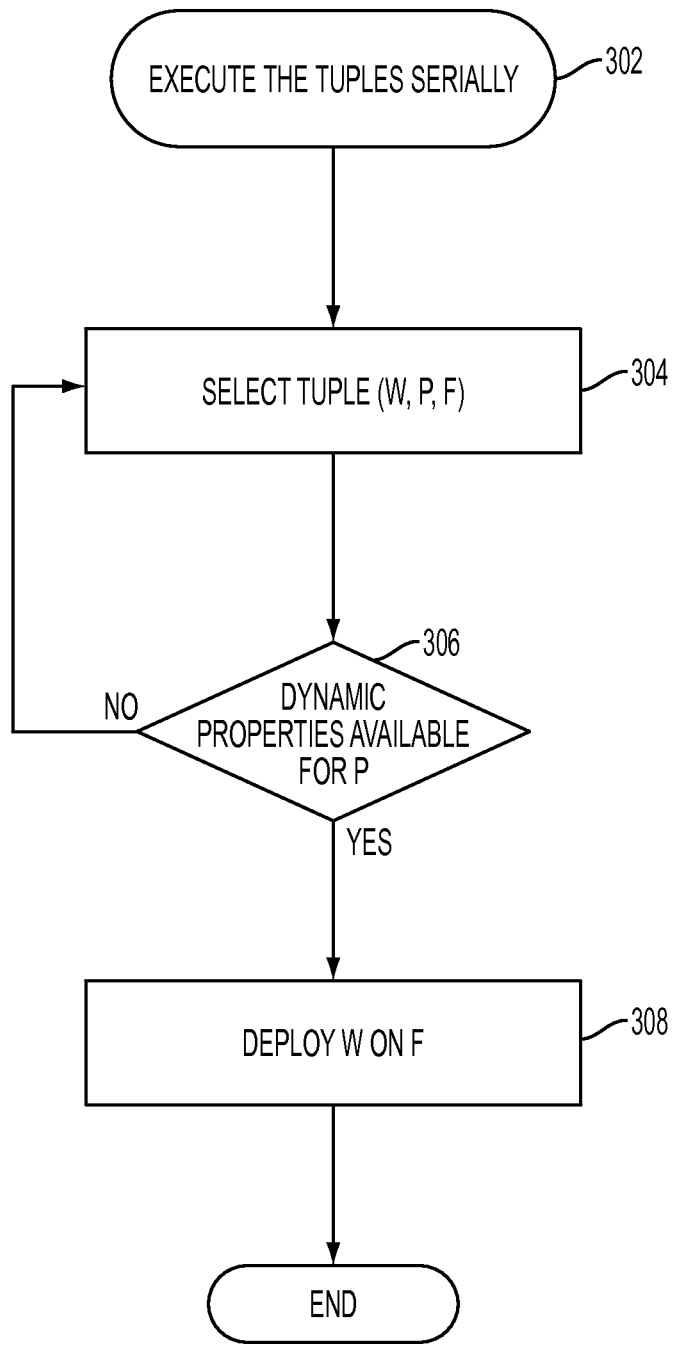
FIG. 3 is a diagram illustrating a method of executing tuples in one embodiment of the present disclosure.

FIG. 3 is a diagram illustrating a method of executing tuples in one embodiment of the present disclosure. At 302, the tuples may be executed serially. At 304, a tuple is selected from the generated list. At 306, it is determined whether dynamic properties required to execute the work unit of the tuple is available for the plugin. If not, the logic returns to 304 to select another tuple from the generated list. If dynamic properties are available at 306, at 308, the work unit of the selected tuple is deployed on the target platform indicated in the tuple.

Figure 4A:
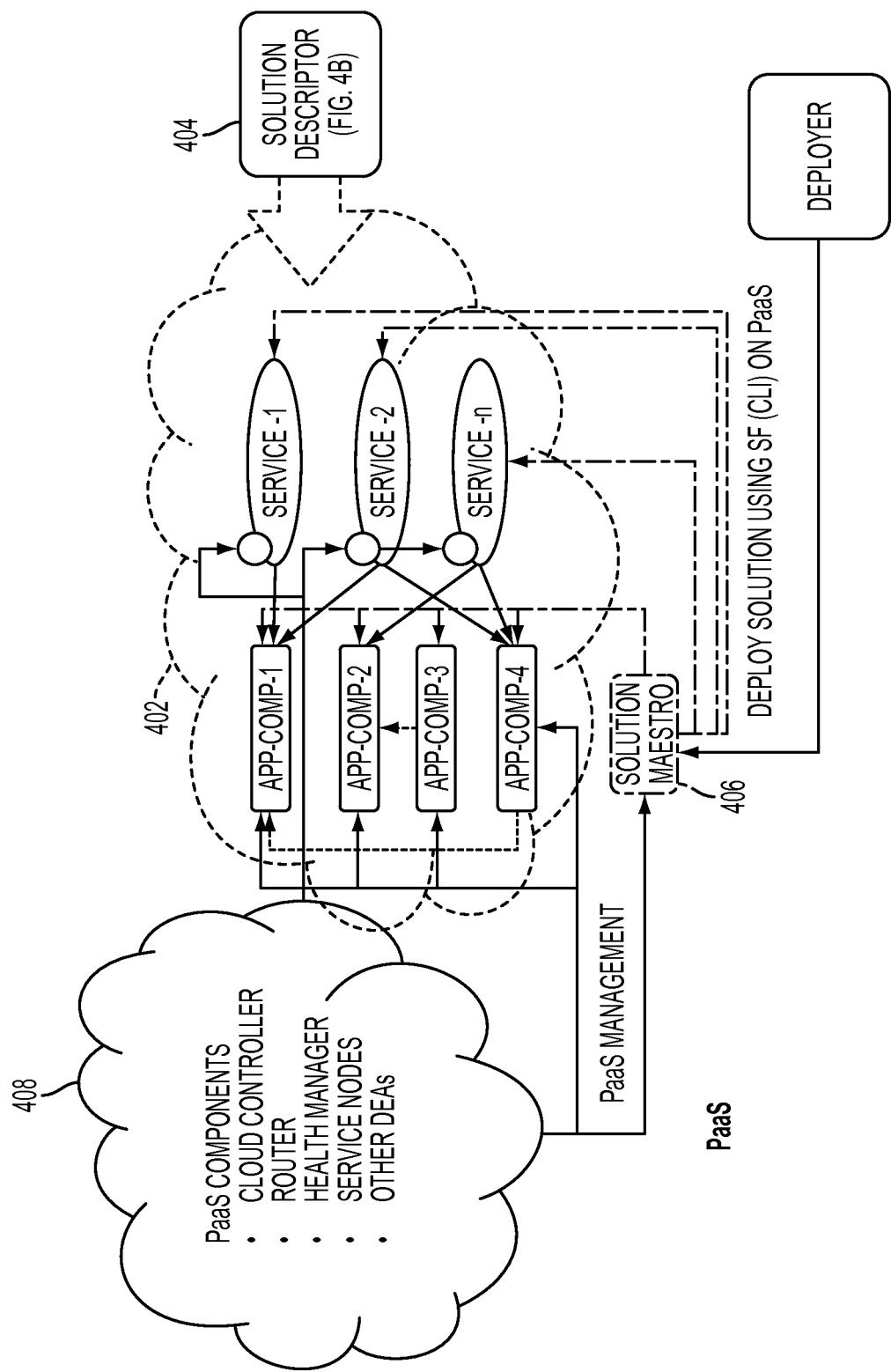
FIG. 4A shows an example of a solution deployment in one embodiment of the present disclosure.

FIG. 4A shows an example of a solution deployment in one embodiment of the present disclosure. In this example, the solution 402 is comprised of four webapp instances (App-Comp-1, . . . , App-Comp-4), and three service instances (Service-1, . . . , Service-n). In this example, ShareFile Command Line Interface (sf CLI) is used to deploy the solution, given the solution descriptor, which drives the solution maestro 406 to create the webapp and service instances 402, configure them by binding service instances to webapp instances and by linking webapp instances (App-Comp-1 with App-Comp-4, and App-Comp-2 with App-Comp-3), and start them. The PaaS components (Cloud Controller, Router, etc.) 408, are elements of the webapp target platform on which the webapp instances are deployed. The PaaS components 408 handle the run-time management of the individual instances 402. FIG. 4B shows an example of a solution descriptor in one embodiment of the present disclosure.

The actual execution of a plugin invokes the following steps. First, the plugin may be loaded by the deployer and instantiated. The deployer then invokes a well defined interface on the plugin object and passes the workload definition (section of the solution descriptor) and the platform definition (section of the environment descriptor) to the plugin. The plugin does what is necessary in order to deploy the workload unit to the target platform and returns the execution results to the deployer.

As described above, a system for the description, deployment and management of composite applications, may include a declarative specification that describes a composite application in terms of an extensible set of component application types and how they relate and depend on each other to make up the composite. A behavior element may interpret and execute the declarative specification by using an extensible set of plug-in elements that manage the behavior of a corresponding extensible set of component type platforms. The behavior element may coordinate and manage the relationships and dependencies of the component applications as described in the declarative specification.

The work units described in FIG. 1 may be of different component application types. The component application types may include one or more of the following: analytics, web applications, applications, document containers, and/or others. The component application type may be an analytic and the analytic plug-in element may gather the following information from one or more platforms (e.g., PaaS), e.g., including web application name, package, number of instances, amount of memory, environment variables, and services to bind with. The component application type may be a web application type and the web application plug-in element may gather the following information from one or more platforms (e.g., PaaS), e.g., including analytics type, name, and parameters. The analytics types may include worker pool, streams, and/or map-reduce. The component application type may be a containerized application and the container's plug-in element may gather information from one or more platforms (e.g., PaaS), e.g., including container name, image name, port bindings, resource limits, and/or environment variables. The behavior element may interpret and execute the declarative specification by using an extensible set of plug-in elements that manage the behavior of a corresponding extensible set of component type platforms, e.g., in (a) obtaining a composite application specification from a user, (b) deploying each component application by invoking the corresponding plug-in elements in phases (e.g., that include creating, configuring, and starting) instances for each of component applications, and (c) coordinating and managing the execution of the component application instances. The behavior element may interpret and execute the declarative specification by coordinating and managing the relationships and dependencies of the component applications as described in the declarative specification in (a) injecting web application end-point references to component applications that refer to them via environment variables, (b) injecting containerized application network addresses and ports to component applications that refer to them via environment variables, and (c) moving data to and from analytics applications sink and source data storage elements.

Figure 6:
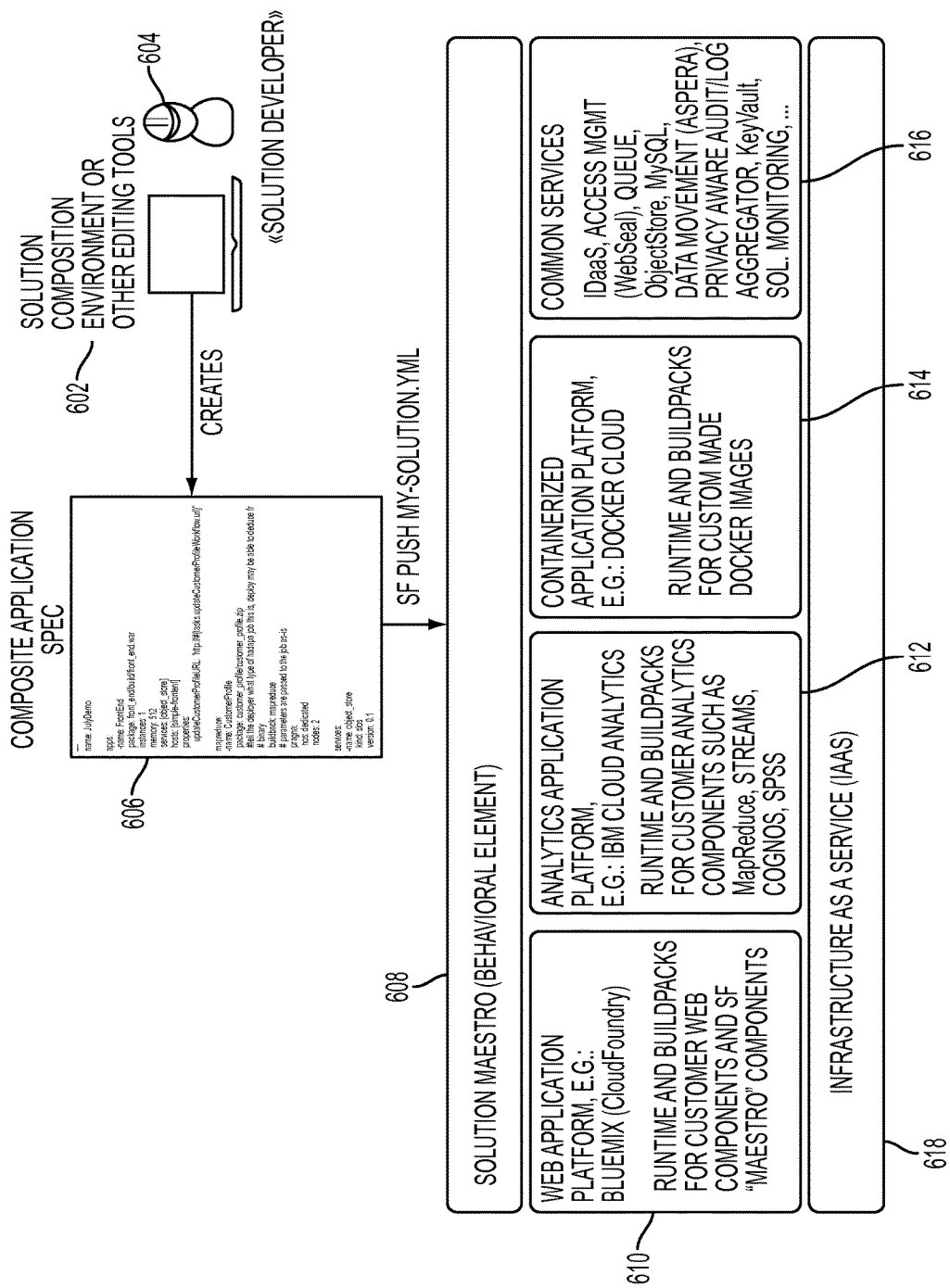
FIG. 6 shows system architecture of a system for managing composite applications in one embodiment of the present disclosure.

FIG. 6 shows system architecture of a system for managing composite applications in one embodiment of the present disclosure. A solution composition environment or another editing tool 602 allows a solution developer 604 to create a composite application specification, 606, also referred to above as a solution descriptor. A behavior element 608, also referred to above as a solution maestro, receives the composite application specification 606, and as described above, generates a list of compatibility tuples, and invokes appropriate plugins to run corresponding workload units on corresponding target platforms (e.g., 610, 612, 614 and 616), provided, for example, on an Infrastructure as a Service (IaaS) 618.

Briefly, Infrastructure as a Service (IaaS) is another service model in cloud computing. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Figure 7:
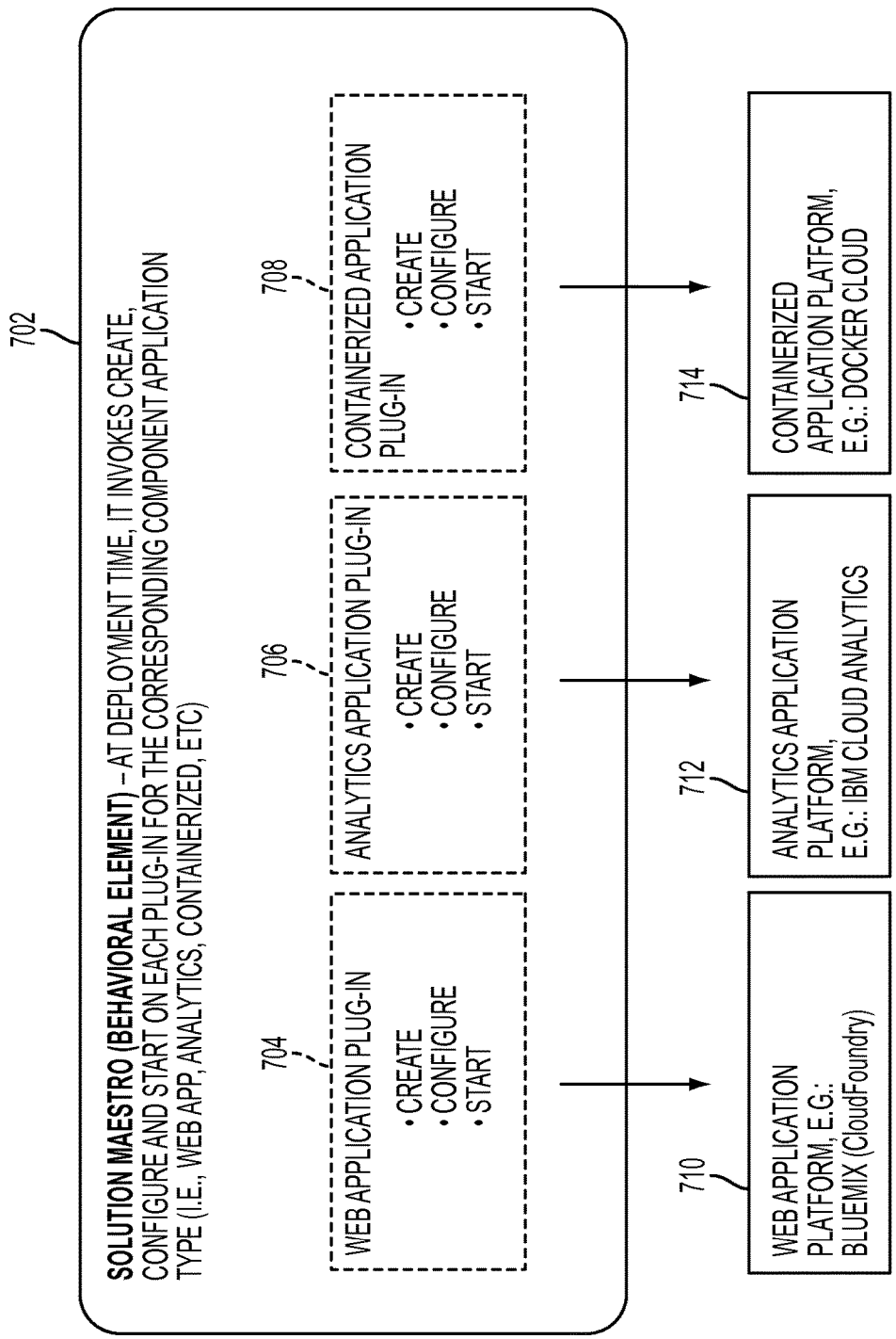
FIG. 7 is a diagram illustrating a behavior element in one embodiment of the present disclosure.

FIG. 7 is a diagram illustrating a behavior element in one embodiment of the present disclosure. The behavior element is also described above as a solution maestro. At deployment time, the behavior element 702 invokes each plug-in for the corresponding component application type, e.g., web application plug-in 704, analytics application plug-in 706, containerized application plug-in 708, and/or others, as specified according to a solution descriptor. The plug-ins 704, 706, 708, create, configure and start the corresponding applications in the corresponding platforms 710, 712, 714.

As described above, the set of component application types is extensible. For example, from one instantiation of the system to the next, the number of component application instances may vary in numbers, and the types of those component applications may vary. While FIGS. 6 and 7 show components application types of analytics, web applications, applications, and containerized applications, other components application types can be handled.

Figure 5:
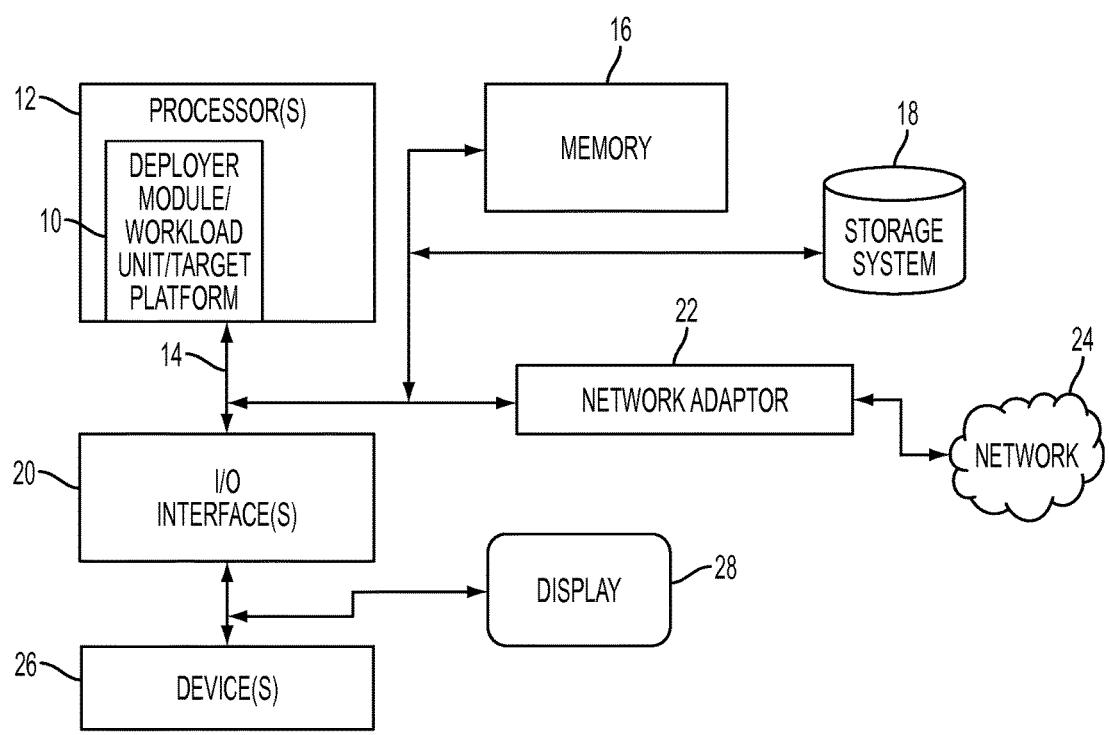
FIG. 5 illustrates a schematic of an example computer or processing system that may implement a composite application management system in one embodiment of the present disclosure.

FIG. 5 illustrates a schematic of an example computer or processing system that may implement a composite application management system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a deployer module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of specifying, deploying and managing composite applications, comprising:

receiving a solution descriptor comprising a set of component workload units, a component workload unit describing a deployable application component with application binary, configuration parameters and dependency declarations;

receiving an environment descriptor specifying a set of target platforms and plugins available in an execution environment;

generating, by a processor, based on the solution descriptor and the environment descriptor, a list of tuples comprising compatible workload-plugin-platform combinations;

determining, by the processor, an execution order for the list of tuples; and invoking, by the processor, the plugins in the list of tuples in the execution order, each of the plugins executing a corresponding compatible component workload unit on a corresponding compatible target platform specified in the list of tuples, wherein the set of component workload units comprises an instance of a component application type in a set of component application types, and the set of component application types is extensible.

2. The method of claim 1, wherein the set of component application types comprises one or more of analytics, web applications, and containerized applications, and the deployer queries the plugins in the execution environment to discover a compatible plugin that is compatible to execute a respective component application type.

3. The method of claim 1, wherein responsive to identifying two or more tuples in the list of tuples for a given component workload unit, the method further comprises resolving by selecting one tuple from said two or more tuples based on weighting the plugins or target platforms or both the plugins and the target platforms specified in the two or more tuples.

4. The method of claim 1, wherein the generating further comprises instantiating all the plugins in the execution environment, and for each combination of component workload unit and target platform generated based on specifications of the solution descriptor and the environment descriptor, interrogating the plugins to determine whether one or more of the plugins support said each combination.

5. The method of claim 1, wherein the list of tuples is generated based on a schema provided by the plugins in the execution environment, the schema specifying which plugin supports which component workload unit and target platform combination.

6. The method of claim 1, wherein the execution order for the list of tuples is determined based on the dependency declarations and based on determining whether one component workload unit requires deployment-time dynamic properties from another component workload unit in the set.

7. The method of claim 1, wherein the plugins are allowed to modify the solution descriptor.

* * * * *